(12) United States Patent
Stephenson et al.

(10) Patent No.: US 8,956,059 B1
(45) Date of Patent: Feb. 17, 2015

(54) SHUTTER WITH POWER-FREE MAGNETIC DETENT

(71) Applicant: Melles-Griot, Rochester, NY (US)

(72) Inventors: Stanley W. Stephenson, Spencerport, NY (US); Frank DeWitt, IV, Lima, NY (US)

(73) Assignee: Melles-Griot, Rochester, NY (US)

( * ) Notice: Subject to any disclaimer, the term of this patent is extended or adjusted under 35 U.S.C. 154(b) by 0 days.

(21) Appl. No.: 14/316,015

(22) Filed: Jun. 26, 2014

(51) Int. Cl.
*G03B 9/10* (2006.01)

(52) U.S. Cl.
USPC .......................................... 396/463; 396/493

(58) Field of Classification Search
USPC ................................. 396/463, 493
See application file for complete search history.

(56) References Cited

U.S. PATENT DOCUMENTS

| | | | |
|---|---|---|---|
| 2,486,169 A | 10/1949 | Kaplowitz | |
| 3,604,330 A | 9/1971 | Fahlenberg et al. | |
| 3,871,012 A * | 3/1975 | Haraguchi | 396/454 |
| 4,312,583 A | 1/1982 | Ohniwa et al. | |
| 4,531,820 A * | 7/1985 | Petersen | 396/464 |
| 4,558,937 A * | 12/1985 | Petersen et al. | 396/464 |
| 5,155,522 A | 10/1992 | Castor et al. | |
| 5,159,382 A | 10/1992 | Lee et al. | |
| 5,173,728 A | 12/1992 | Sangregory et al. | |
| 5,446,514 A * | 8/1995 | Matsumoto | 396/463 |
| 5,489,959 A * | 2/1996 | Akada | 396/508 |
| 5,502,524 A | 3/1996 | Bovenzi et al. | |
| 5,691,583 A | 11/1997 | Suzuki et al. | |
| 5,705,873 A | 1/1998 | Sato | |
| 5,708,893 A * | 1/1998 | Furlani et al. | 396/464 |
| 6,046,519 A | 4/2000 | Hanazumi et al. | |
| 6,123,468 A | 9/2000 | Furlani et al. | |
| 6,443,635 B1 * | 9/2002 | Matsumoto et al. | 396/463 |
| 6,530,703 B2 | 3/2003 | Nakano et al. | |
| 6,652,165 B1 | 11/2003 | Pasquarella et al. | |
| 6,705,776 B2 * | 3/2004 | Watanabe | 396/463 |
| 6,714,733 B2 * | 3/2004 | Kobayashi | 396/133 |
| 7,652,549 B2 | 1/2010 | Hadden et al. | |
| 7,845,865 B2 | 12/2010 | Viglione et al. | |
| 8,132,973 B2 * | 3/2012 | Huang | 396/463 |
| 8,137,012 B2 * | 3/2012 | Huang | 396/463 |

(Continued)

OTHER PUBLICATIONS

David Durfee, Walter Johnson, Scott McLeod "Advanced electro-mechanical micro-shutters for thermal infared night vision imaging and targeting systems", Infared Technology and Applications XXXIII, Proc. of SPIE, vol. 6542, 65422C (2007).

Frank DeWitt, David Durfee, Stanley Stephenson, "Shutter Subsystems for Infared Imagers" Society of Photo-Optical Instrumentation Engineers, (2010). CVI Melles Griot, White Paper.

(Continued)

*Primary Examiner* — W B Perkey
(74) *Attorney, Agent, or Firm* — Louis S. Horvath

(57) ABSTRACT

An optical shutter apparatus has a shutter blade pivotable between first and second positions. The shutter blade in the first position blocks at least a portion of a light path. A stepper motor pivots the shutter blade to first or second positions. A magnetic shutter blade retention apparatus has a first movable member with a first surface, coupled to the shutter blade. A first stationary member is spaced apart from the shutter blade and is magnetically attracted to the first stationary member when the stepper motor is de-energized. When the shutter blade is pivoted to the first position, a point on the first surface is spaced apart from the first stationary member by a first distance; when the shutter blade is pivoted to the second position, the point on the first surface is spaced apart from the first stationary member by a second distance that is less than the first.

18 Claims, 11 Drawing Sheets

(56) References Cited

U.S. PATENT DOCUMENTS 8,851,768 B1 * 10/2014 Stephenson .................. 396/463
2007/0172231 A1 * 7/2007 Durfee ......................... 396/463

OTHER PUBLICATIONS

Commonly assigned co-pending U.S. Appl. No. 13/463,981 to Stephenson, filed May 4, 2012.

* cited by examiner

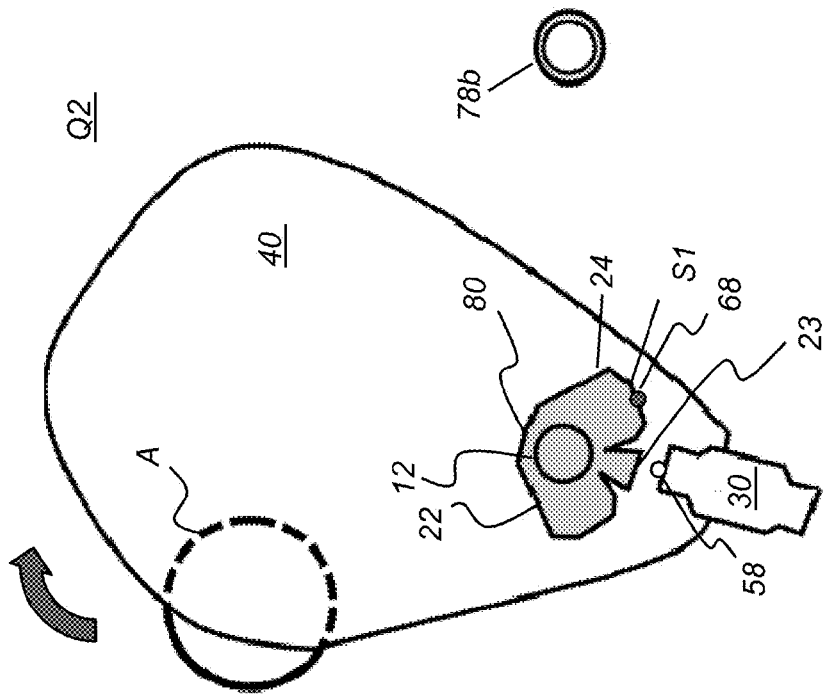
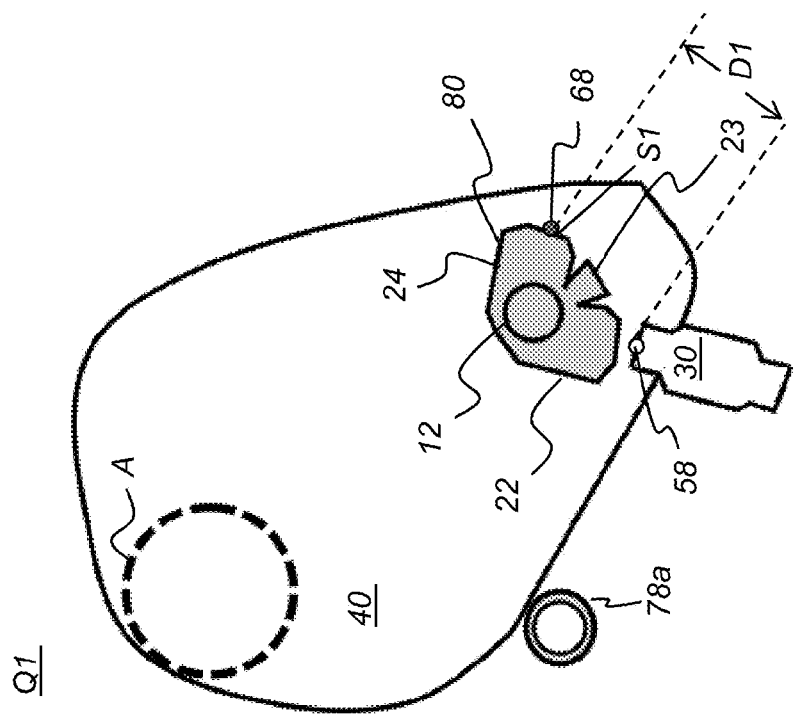
FIG. 2J
FIG. 2I

SHUTTER WITH POWER-FREE MAGNETIC DETENT

FIELD OF THE INVENTION

The present invention relates generally to optical shutter apparatus and more particularly relates to optical shutter apparatus having a stepper motor drive and a retention apparatus that provides blade retention in both the powered state and unpowered state.

BACKGROUND OF THE INVENTION

Optical shutters use an actuator to drive each of one or more radiation-blocking elements or "shutter blades", between a first, closed position that blocks the path of light through at least a portion of an aperture and a second, open position that is spaced apart from the first position and that allows light through the aperture. The light radiation that is directed toward the aperture can generally be any form of electromagnetic radiation, such as ultra-violet, visible or infrared radiation, for example. The aperture can be in a frame that is directly or indirectly coupled to the actuator. The frame can additionally support the actuator and typically includes features that retain the shutter blade or blades and that define the travel path of the shutter blade or blades. The actuator can be electromagnetically activated (an "electromagnetic actuator") so that it responds to an electrical signal to translate the shutter blade or blades in a plane between the open and closed positions. Electromagnetic actuators typically used for this purpose include linear solenoids, rotary solenoids, or brushed or brushless commutated motors, for example.

Actuators for optical shutters can be monostable or bistable. Monostable shutters have a single stable position to which the actuator returns when power is removed. Bistable actuators are able to remain in the last position held at the time power is removed.

Monostable solenoid actuators have a coil of wire that generates a magnetic field when electrical power is applied. The magnetic field applies a force to pull or rotate a soft magnetic core in a given direction. Monostable actuators with soft magnetic cores typically utilize a spring or other mechanical element to return the core to an original position when power is removed. One disadvantage of monostable actuators for shutter control relates to their behavior upon power loss; these actuators require continuous power to remain in the electrically driven state.

Bistable actuators are stable in the state held when power is removed, whether open or closed. Bistable actuators can be created using geared motor drives that lock in a given position when unpowered. In other embodiments, an over-center spring can be used to create a locking force in either of the open or closed positions.

The soft magnetic core of a monostable solenoid can be replaced with a hard magnet that adheres to soft magnetic material in each of its two positions to create a bistable shutter. For example, the rotary drive solenoids (RDS) produced by CVI Melles-Griot are exemplary bistable rotary solenoids, each using a permanent magnet core. Further description of bistable actuators of this type can be found, for example, in *Proceedings of SPIE*, Vol. 6542, "Advanced electro-mechanical micro-shutters for thermal infrared night vision imaging and applications" by Durfee et al. Bistable actuators are advantaged for their small size and light weight. However, these actuators have their limitations. Because they typically have relatively small coil elements, bistable rotary actuators used for shutter applications can be damaged by the application of continuous power and are typically pulsed intermittently so that energy can be more quickly dissipated. These devices can be constrained in terms of travel arc, allowing the blade to swing over an arc of 20 degrees or less between open and closed positions. This, in turn, tends to limit the size of the aperture.

Stepper motors can alternately be used to drive the shutter blade between the two open and closed positions. U.S. Pat. No. 6,046,519 entitled "Stepping Motor" to Hanazumi et al. provides a description of the structure of conventional "tin can" stepper motor shutters. Hanazumi '519 teaches the steps of providing a permanent magnet with a plurality of poles and sets of pole teeth energized by two coils. The magnet is attached to a shaft. Changing polarity of the electric field in the coils creates an electromagnetic field that works with the magnetic poles to induce rotary motion in a shaft. In an alternate approach, U.S. Pat. No. 5,691,583 entitled "Stepping Motor with Internal Power Connections" to Suzuki et al. describes a different structure for a stepper motor, with the coils centrally located and with the poled magnet in cylindrical form, exterior to the centrally located coils.

Stepper motor-driven shutters are advantaged over solenoid types in that shutter motion can be more closely controlled to reduce shock from impact when the shutter blade is moving between positions. The stepper motor has a rotor that is a permanent magnet having multiple poles or teeth. A set of at least two stators is disposed adjacent to the rotor. The stators have projections that magnetically interact with the magnetic poles or teeth on the rotor. Two coils operate on the stators to generate electromagnetic fields in each of the two stator arms. The fields in the stator arms operate on the poles in the rotor to selectively rotate the rotor from one angular position to the next. The polarity of the two coils can be sequentially changed by reversal of current direction to provide rotation of the stepper motor shaft in either direction.

Stepper motors have an inherent detent torque that provides a small amount of holding force when the stepper motor is de-energized. When the motor is de-energized, the stepper motor shaft settles to a detent angular position where there is maximum attraction between the stator and the poles of the rotor. This detent position has an associated detent torque. The torque needed to move the shaft from this detent position, wherein the torque is generated by applying electrical power to the coils, is significantly higher than the detent torque. In typical stepper motor shutters, a high amount of electrical energy is applied to overcome detent torque and move the blade. Then, once the blade is at a given position, the power to the coils is reduced to provide a holding torque, typically at about half power, that magnetically retains the blade in position after movement.

In some shutter applications, the motion of the blade is relatively infrequent and a minimum of energy is needed for moving the shutter between successive angular positions. In such applications, the stepper motor shutter is generally not the best option, particularly when the blade must be held at a position that is not an un-energized detent position. It is undesirable to apply continuous holding power to the stepper motor when the shutter is not moving but remains in an open or closed position; the need to maintain power when the shutter is stationary wastes energy.

In some applications, there is a need for a system to hold a stepper motor shutter blade in a non-detent position when the stepper motor is not energized. A mechanical holding force can be provided for this purpose; however, this type of solution can require additional components and increased cost, with added concerns for wear and reliability.

Wear and lifetime considerations also relate to operation and parts count. For many types of shutters, a damping apparatus is provided to eliminate or reduce bounce and to help reduce the effects of impact with damper contact at the end of shutter blade travel. However, stops and other damping devices add to parts count and can be wear items.

Thus, it can be seen that there is a need for a stepper motor shutter that has a low parts count and that can be de-energized and still exhibit suitable retention torque.

SUMMARY OF THE INVENTION

It is an object of the present invention to advance the art of optical shutter design. Embodiments of the present invention provide a shutter apparatus that uses a stepper motor to pivot the shutter blade between first and second positions and employs a magnetic detent to hold the blade in the pivoted position when the stepper motor is de-energized.

According to an aspect of the present invention, there is provided an optical shutter apparatus comprising:
- a) a shutter blade that is pivotable between a first position and a second position that is spaced apart from the first position, and wherein the shutter blade in the first position blocks at least a portion of a light path;
- b) a stepper motor that is energizable to pivot the shutter blade to at least the first or second positions; and
- c) a magnetic shutter blade retention apparatus that has:
  - (i) at least a first movable member with a first surface, and wherein the at least the first movable member is coupled to the shutter blade; and
  - (ii) at least a first stationary member that is spaced apart from the shutter blade,
- wherein the at least the first movable member is magnetically attracted to the at least the first stationary member when the stepper motor is de-energized and wherein, when the shutter blade is pivoted to the first position by the stepper motor, a point on the first surface is spaced apart from the at least the first stationary member by a first distance, and
- wherein, when the shutter blade is pivoted to the second position by the stepper motor, the point on the first surface is spaced apart from the at least the first stationary member by a second distance that is less than the first distance.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIGS. 2I, 2J, and 2K are top views that show a shutter blade in two alternate positions relative to an aperture, in an embodiment of the present invention in which shutter blade retention uses a single movable member and a single stationary member and has three retention positions.

DETAILED DESCRIPTION OF THE INVENTION

Figure 1:
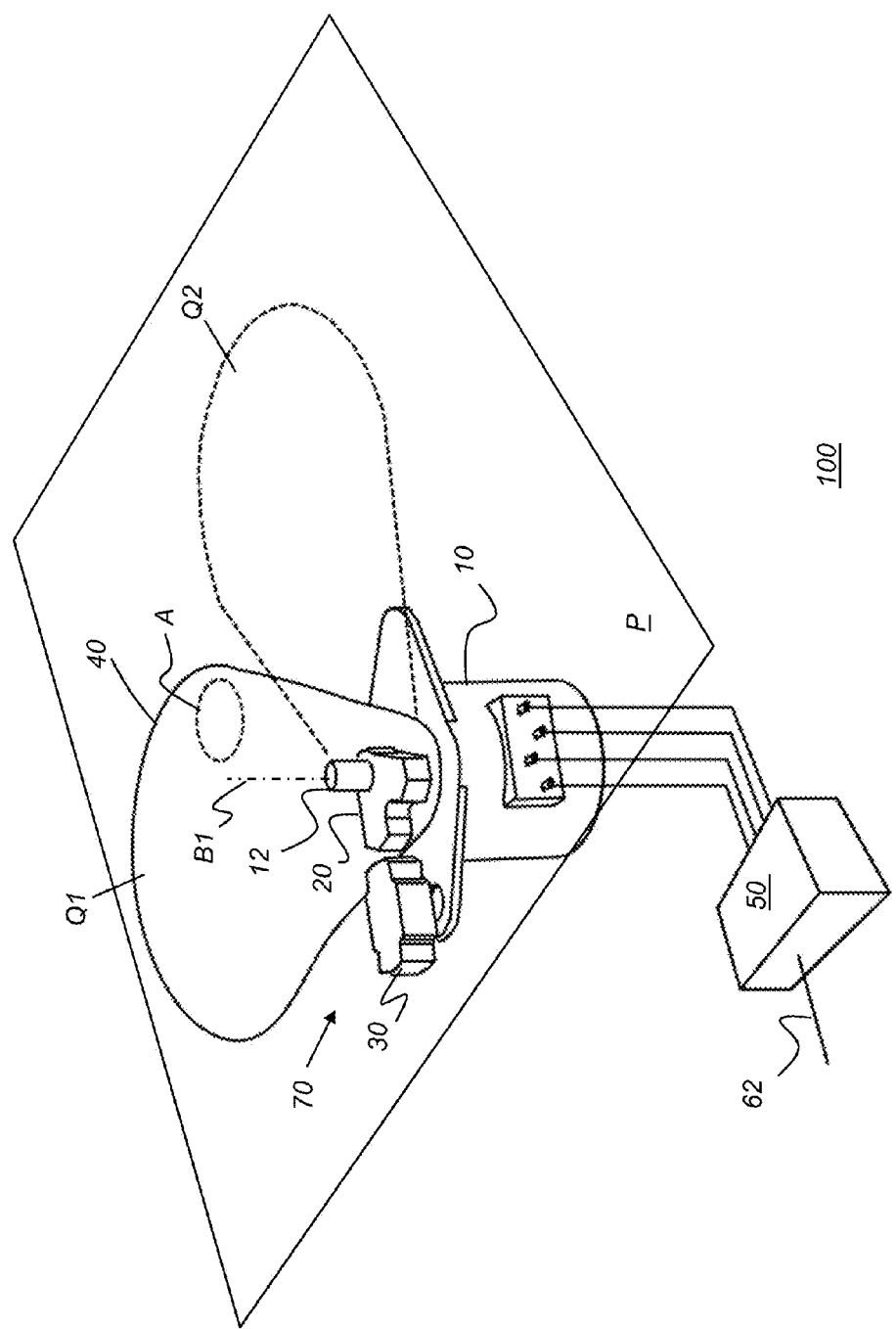
FIG. 1 is a perspective view of a stepper motor shutter apparatus in accordance with an embodiment of the present invention.

Figures provided herein are given in order to illustrate principles of operation and component relationships according to the present invention and are not drawn with intent to show actual size or scale. Some exaggeration may be necessary in order to emphasize basic structural relationships or principles of operation. Some conventional components that would be needed for implementation of the described embodiments, such as support components used for providing power, for packaging, and for mounting, for example, are not shown in the drawings in order to simplify description of the invention. In the drawings and text that follow, like components are designated with like reference numerals, and similar descriptions concerning components and arrangement or interaction of components already described may be omitted.

Where they are used, the terms "first", "second", and so on, do not necessarily denote any ordinal or priority relation, but may be used for more clearly distinguishing one element or time interval from another. The term "plurality" means at least two.

In the context of the present disclosure, the term "energizable" describes a component or device that is enabled to perform a function upon receiving power and, optionally, upon also receiving an enabling signal.

In the context of the present disclosure, positional terms such as "top" and "bottom", "upward" and "downward", and similar expressions are used descriptively, to differentiate different surfaces, sides, or views of an assembly or structure and do not describe any necessary orientation of the assembly in a mechanical or optical apparatus.

In the context of the present disclosure, the term "coupled" is intended to indicate a mechanical association, connection, relation, or linking between two or more components, such that the disposition of one component affects the spatial disposition of a component to which it is coupled. For mechanical coupling, two components need not be in direct contact, but can be linked through one or more intermediary components.

Non-magnetic materials are materials that are negligibly affected by magnetic fields and that exhibit no perceptible magnetic attraction and are thus not perceptibly pulled toward a magnet. In general, non-magnetic materials have a low relative magnetic permeability, typically not exceeding 1.0 at room temperature. Some exemplary non-magnetic materials include copper, aluminum, standard stainless steel, and most metals and alloys; sapphire; various ceramics; wood and paper composite materials; glass; water; plastics and other polymers; fiberglass; and various composite materials such as phenolic materials. Magnetic materials have higher relative permeability and are considered to be "magnetically responsive", exhibiting magnetic attraction that can be readily perceived without requiring instrumentation; this includes ferromagnetic materials and various compounds of rare earth materials, for example.

There are two general classes of ferromagnetic materials. Permanent magnets are made from "hard" ferromagnetic materials such as alnico and ferrite that are subjected to special processing in a powerful magnetic field during manufacture, to align their internal microcrystalline structure to exhibit a magnetic flux field. Magnetically "soft" materials like annealed iron, on the other hand, can be magnetized for a period of time, but do not tend to stay magnetized. To demagnetize a saturated magnet, a magnetic field of a given threshold must be applied, and this threshold depends on coercivity of the respective material. "Hard" materials that behave as permanent magnets have high coercivity, whereas "soft" materials have low coercivity. By way of example, electrical steel, used as a flux carrier in many electrical devices, exhibits coercivity values in the range of about 0.5 oersteds; samarium cobalt, used for rare earth permanent magnets, has coercivity in the range of about 40,000 oersteds.

Stepper motors using permanent magnets have a detent torque, also termed a remnant position-holding torque, a "no-current" torque, or cogging torque. This detent torque is due to the interaction between the permanent magnets of the rotor and the stator internal to the motor. Detent torque is position-dependent, with a periodicity per revolution that is based on the number of magnetic poles and number of teeth on the stator.

As noted previously in the background section, the inherent detent torque of the stepper motor provides a small amount of holding power when the stepper motor is de-energized. When power is removed, the stepper motor shaft preferentially settles in a position at which features on stator and rotor poles exhibit maximum magnetic attraction. The electrical energy that is needed for motor actuation must overcome this detent torque in order to pivot the shutter blade between positions. In some types of stepper motor shutters, power is reduced but not removed when the shutter is in a given position. Reduction of power, such as to half the level needed for shutter actuation, provides a holding torque that exceeds the inherent detent torque and reduces the likelihood of shutter blade movement due to shock, vibration, gravity, or other causes.

Providing a reduced current to maintain a holding torque works well in many shutter applications, but has drawbacks when shutter actuation is intermittent or infrequent and when energy use is a concern. Providing reduced power to maintain holding torque would be a disadvantage, for example, where the shutter is a component in portable, battery-powered equipment.

Embodiments of the present invention use a magnetic circuit to provide a solution that is particularly suited to applications in which shutter blade motion is infrequent or intermittent and energy use must be reduced. These embodiments also provide a solution in applications where the shutter blade must be held in a non-detent position, between adjacent steps of the stepper motor shaft, when the stepper motor is not energized. Magnetic attraction is used to provide a retention torque, applying magnetic force that exceeds the inherent detent torque of the stepper motor but is, in turn, less than the driving force that is used to pivot the shutter blade between open and closed positions.

FIG. 1 is a perspective view of an optical stepper motor shutter apparatus 100 in accordance with an embodiment of the present invention. A stepper motor 10, under control of a motor control 50 based on a signal 62, pivots a shutter blade 40 to first and second positions Q1 and Q2 within a plane P. At first position Q1, shutter blade 40 blocks an aperture A that is in the light path to plane P. At alternate position Q2, shown in dashed outline, shutter blade 40 allows light to pass through aperture A. Shutter blade 40 is coupled to a shaft 12 of stepper motor 10. The attachment can be a mechanical coupling or can be formed using an adhesive such as epoxy or cyanoacrylate material. Attachment can alternately be provided by a weld formed using electrical energy or a laser. Blade 40 is typically a metal blade of aluminum, spring steel, or stainless steel, and is typically non-magnetic but can be formed of a magnetic material. Blade 40 is alternately a polymer or other thin, stiff sheet material. Stepper motor 10 is energizable through motor control 50 to rotate in both clockwise and counterclockwise directions.

Still referring to FIG. 1, a magnetic shutter blade retention apparatus 70 has a movable member 20 that rotates about an axis B1 and is coupled to shutter blade 40. Magnetic shutter blade retention apparatus 70 also has a stationary member 30 that is stationary with respect to magnetic shutter blade retention apparatus 70 and is spaced apart from shutter blade 40. One of members 20 and 30 is a permanent magnet; the other member is formed of a soft magnetic material such as iron. Thus, there is magnetic attraction between movable and stationary members 20 and 30. In the embodiment shown in FIG. 1, movable member 20 is coupled to shaft 12; movable member 20 may alternately be spaced apart from shaft 12, provided that movable member 20 is coupled to shutter blade 40.

Figure 2A:
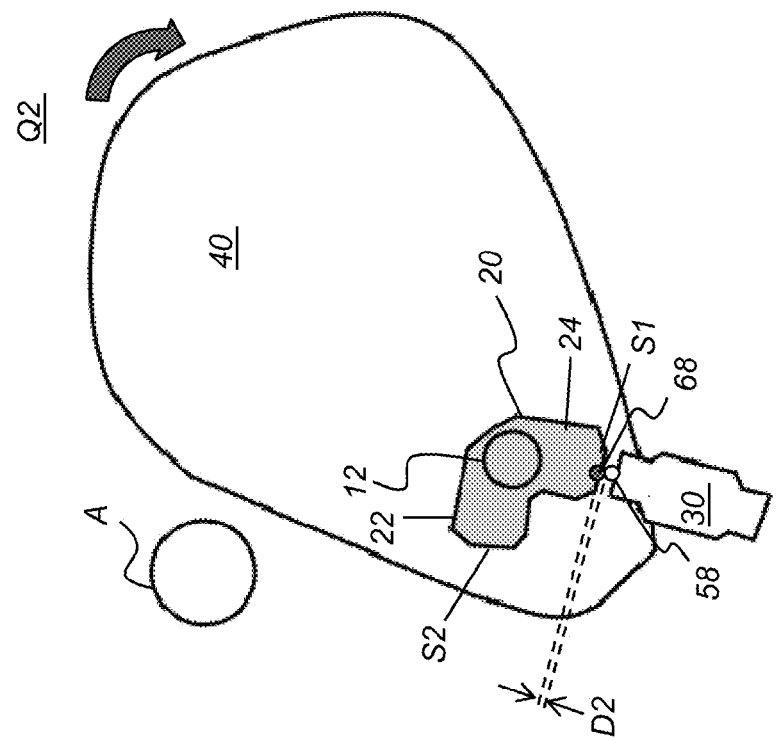
FIGS. 2A and 2B are top views that show a shutter blade in two alternate positions relative to an aperture, in an embodiment of the present invention in which shutter blade retention uses a single movable member and a single stationary member.
Figure 2B:
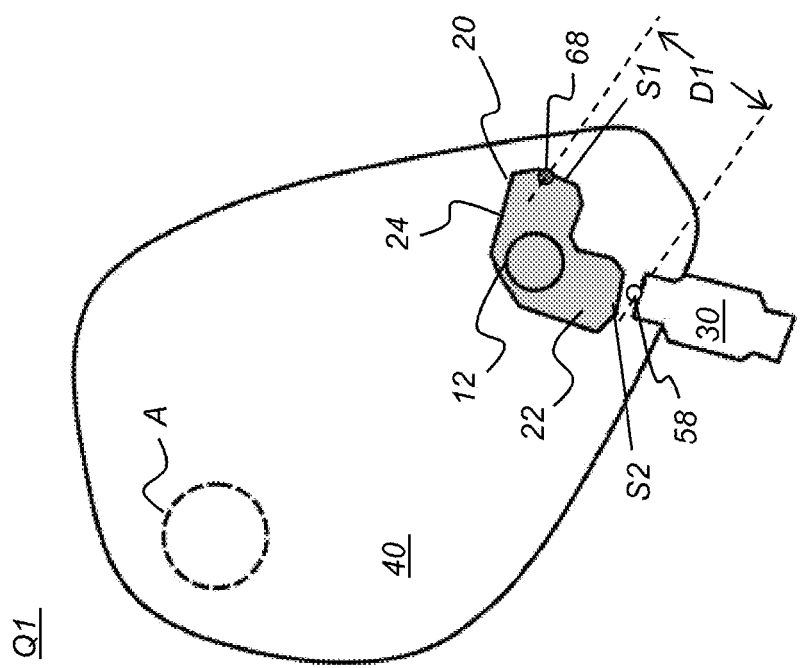

FIGS. 2A and 2B show, in schematic top views, how movable member 20 and stationary member 30 provide shutter blade retention for positions Q1 and Q2 of FIG. 1, respectively, according to an embodiment of the present invention. When shutter blade 40 is pivoted to the first position Q1, a first distance between a first point 58 on stationary member 30 and a point 68 on a first surface S1 of movable member 20 exceeds a second distance between the first point 58 on stationary member 30 and point 68 on the first surface of movable member 20 when the shutter blade 40 is in the second position Q2. Thus, correspondingly, a distance D1 between points 58 and 68 at the Q1 position in FIG. 2A exceeds a distance D2 between these two points at the Q2 position in FIG. 2B. Alternately stated, the force exerted by magnetic attraction between stationary member 30 and first surface S1 with shutter 40 at the Q1 position of FIG. 2A is less than the force exerted by magnetic attraction between stationary member 30 and first surface S1 at the Q2 position of FIG. 2B.

Figure 2D:
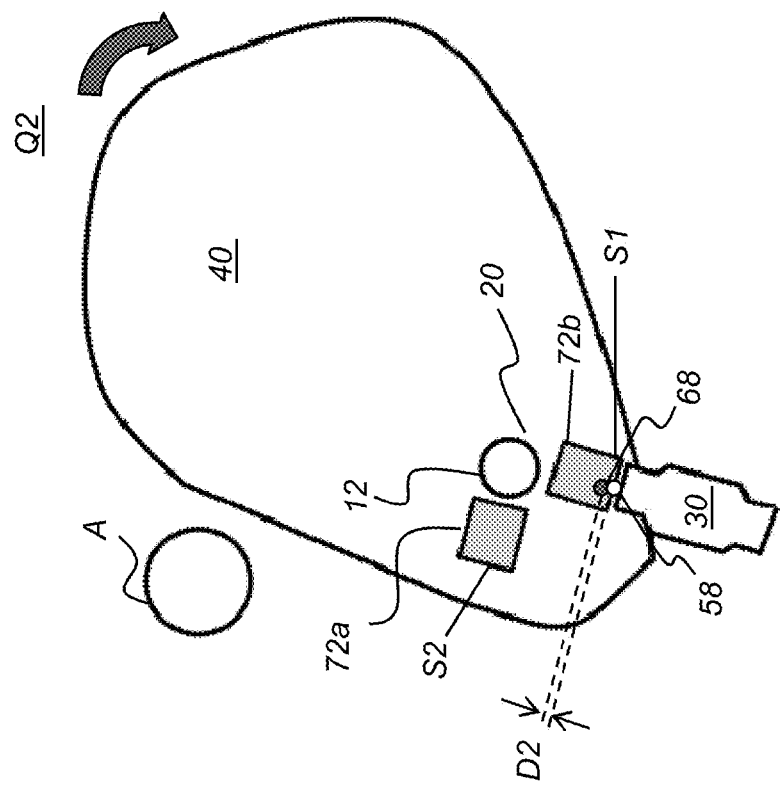
FIGS. 2C and 2D are top views that show a shutter blade in two alternate positions relative to an aperture, in an alternate embodiment of the present invention in which shutter blade retention has two movable members and a single stationary member.
Figure 2C:
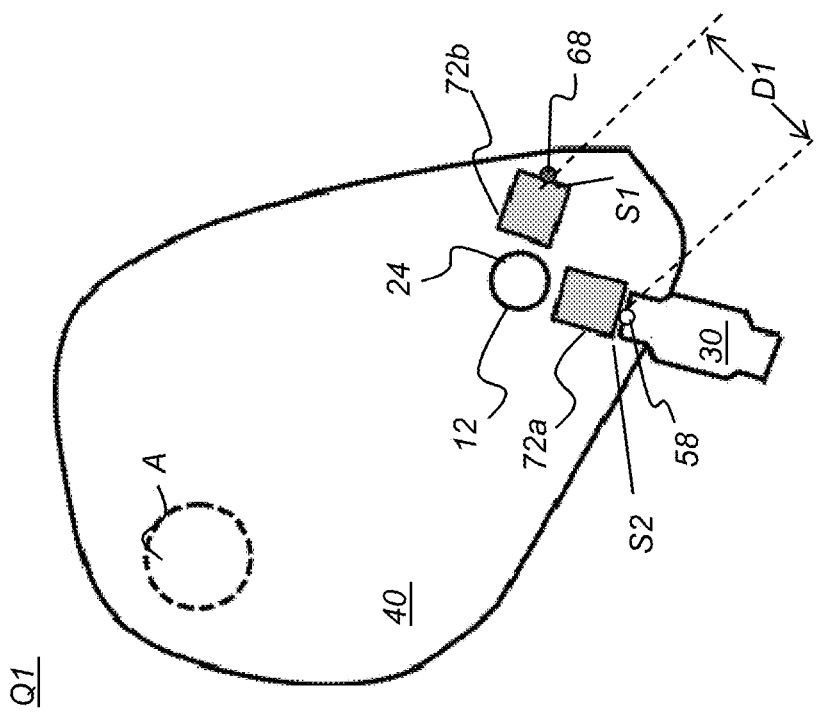

Movable member 20 shown in FIGS. 1, 2A and 2B is shaped with angled arms 22 and 24 so that the appropriate surface S1 or S2 is disposed closest to stationary member 30 for the corresponding position of shutter blade 40. FIGS. 2C and 2D show an alternate embodiment of the present invention in which there are two movable members, shown as 72a and 72b. When shutter blade 40 is pivoted to the first position Q1, first distance D1 between first point 58 on stationary member 30 and point 68 on a first surface S1 of movable member 72b exceeds second distance D2 between the first point 58 on stationary member 30 and point 68 on the first surface S1 of movable member 72b when the shutter blade 40 is in the second position Q2, with movable member 72b nearest stationary member 30. Thus, correspondingly, the distance between points 58 and 68 at the Q1 position in FIG. 2C exceeds the distance between these two points at the Q2 position in FIG. 2D. Either stationary member 30 or movable members 72a and 72b can be magnetic.

Figure 2F:
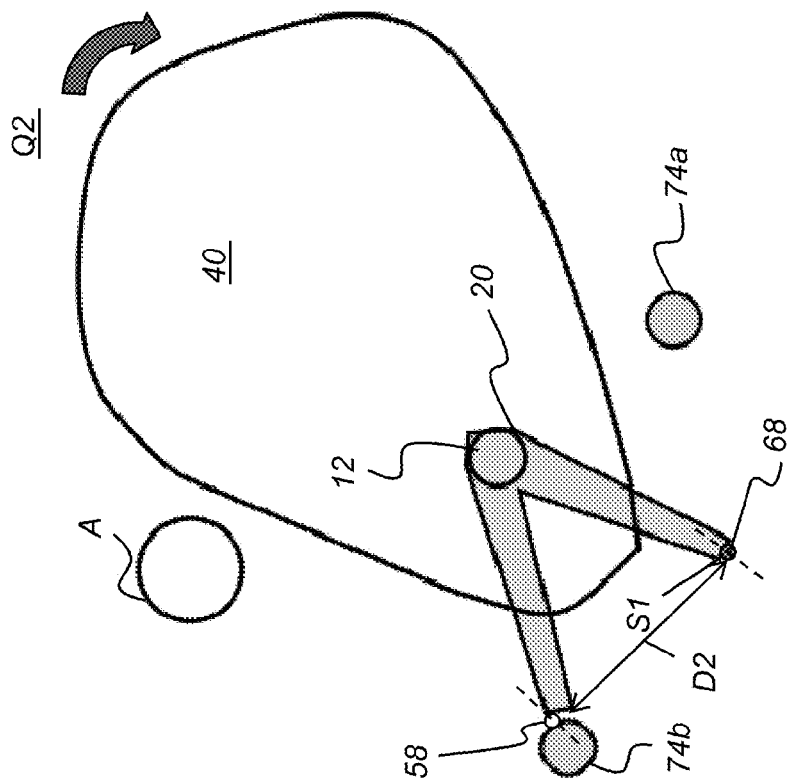
FIGS. 2E and 2F are top views that show a shutter blade in two alternate positions relative to an aperture, in an alternate embodiment of the present invention in which shutter blade retention has a single movable member and multiple stationary members.
Figure 2E:
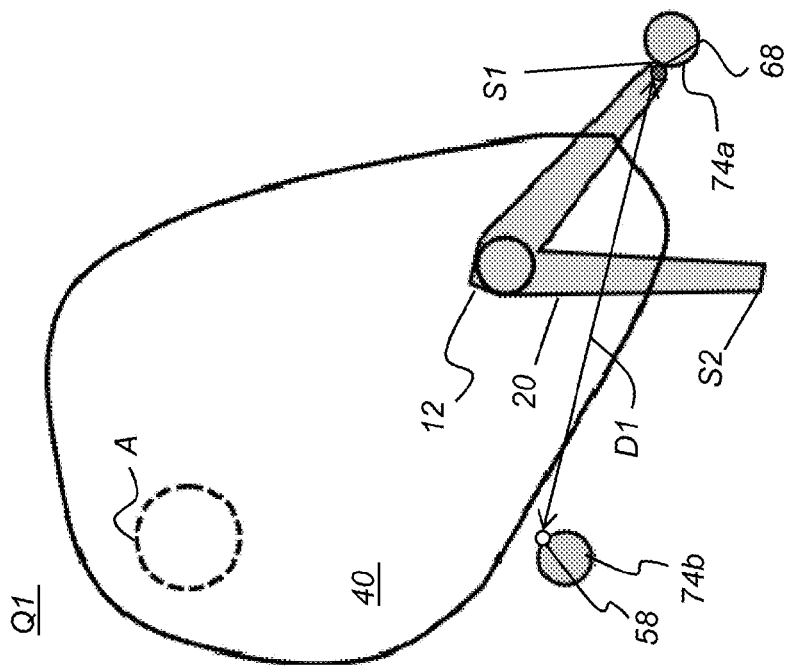

FIGS. 2E and 2F show an alternate embodiment of the present invention in which there are two stationary members, shown as 74a and 74b. When shutter blade 40 is pivoted to the first position Q1, a first distance between first point 58 on stationary member 74b and point 68 on a first surface S1 of movable member 20 exceeds second distance D2 between the first point 58 on stationary member 74b and point 68 on the first surface S1 of movable member 20 when the shutter blade 40 is in the second position Q2. Because the distance between points 58 and 68 at the Q1 position in FIG. 2E exceeds the distance D2 between these two points at the Q2 position in FIG. 2F the magnetic attraction between members 20 and 30 varies accordingly between these positions.

Figure 2H:
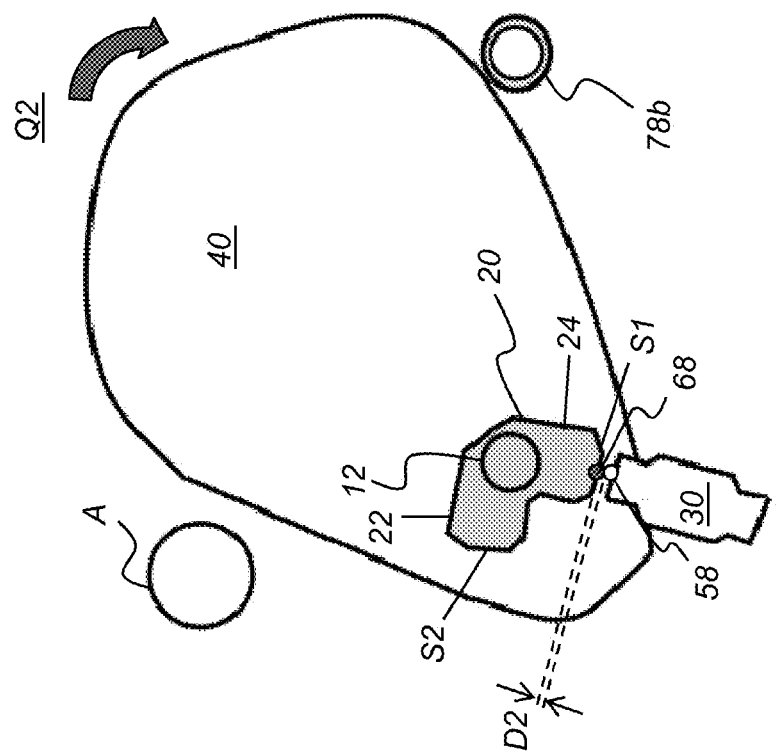
FIGS. 2G and 2H are top views that show a shutter blade in two alternate positions relative to an aperture, in an alternate embodiment of the present invention in which shutter blade retention also uses a stop.
Figure 2G:
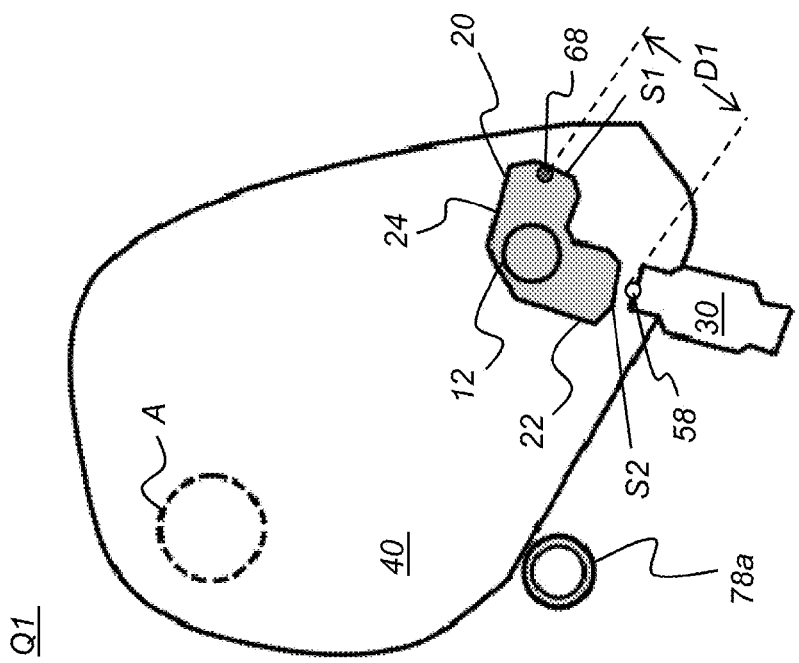

Contactless retention offers a number of advantages including fewer wear parts and reduced shock and vibration from impact. Thus, with respect to FIGS. 2A and 2B, for example, blade 40 "overshoot" travel past position Q1 or past position Q2 would be unobstructed. However, there can be advantages to an embodiment that employs stops for restricting blade motion and suppressing overshoot or settling time movement or vibration at the end of blade travel. FIGS. 2G and 2H show stops 78a and 78b for stopping blade 40 motion at positions Q1 and Q2, respectively.

Figure 2K:
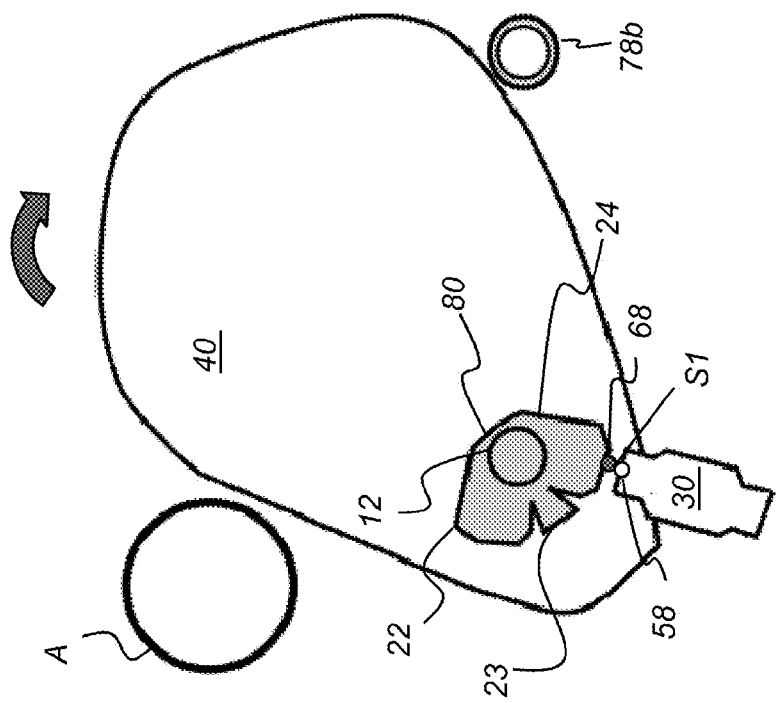

More than two shutter blade 40 positions can be provided, such as when it may be useful to block different portions of the light through aperture A. FIGS. 2I, 2J, and 2K show different positions of a three-position optical stepper motor shutter apparatus according to an embodiment of the present invention. A movable member 80 that is coupled to shutter blade 40 has three arms 22, 23, and 24 or other features configured to retain blade 40 at each of three angular positions Q1, Q2, and Q3. At position Q1, fully blocking aperture A as shown in FIG. 2I, first arm 22 is situated closest to stationary member 30. At position Q2 as shown in FIG. 2J, second arm 23 is situated closest to stationary member 30. Aperture A is partially blocked. At a position Q3, allowing light through aperture A as shown in FIG. 2K, third arm 24 is situated closest to stationary member 30. Stops 78a and 78b are optional. The distance between points 58 and 68 decreases with each successive shutter blade 40 position in the ordered sequence of FIGS. 2I, 2J, and 2K.

From the top view examples shown in FIGS. 2A through 2K, it is clear that there can be a number of further embodiments of the present invention that use some combination of fixed and movable members with or without stops for shutter apparatus having two or more shutter positions. Movable members can be coupled to shaft 12 of the stepper motor or may be coupled directly to the surface or edge of shutter blade 40. Either the stationary or movable members can be magnets; the corresponding member that is attracted to the magnet is of a soft magnetic material. It should also be noted that, while the stepper motor characteristically has an integer number of step positions, embodiments of the present invention allow the stepper motor shaft to be stopped between two adjacent step positions when the shutter blade is in either the first or second position.

Figure 3:
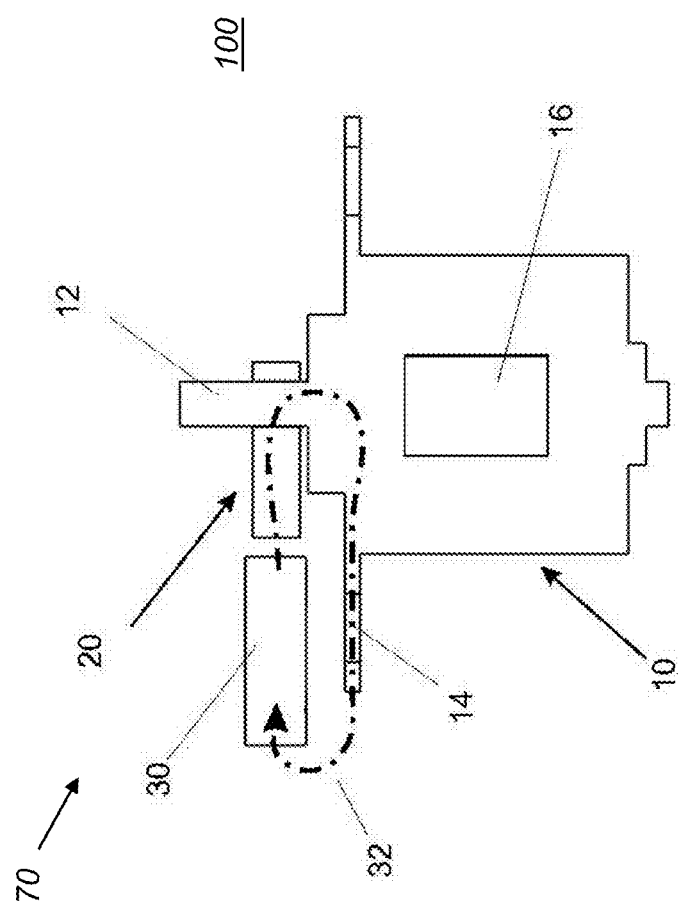
FIG. 3 is a section view of a stepper motor shutter apparatus according to an embodiment of the present invention.

The cross-section side view of FIG. 3 shows components of optical stepper motor shutter apparatus 100 and shows how the magnetic circuit formed by shutter blade retention apparatus 70 operates. The dot-dash line traces a magnetic flux path 32 for shutter blade retention apparatus 70. In the arrangement shown, shaft 12 and a flange 14 of stepper motor 10 are magnetic material such as electrical steel and thus conduct at least a substantial portion of the magnetic field between members 20 and 30. Having a magnetically conductive closed path helps to concentrate the magnetic field and to optimize attractive force between member 30 and member 20. Beveled surfaces (S1 and S2 in FIG. 2A, 2B) help to center the magnetic flux field where stationary member 30 is a magnet. Stepper motor 10 has a rotor 16 about the shaft 12 in the embodiment of the present invention that is shown.

Figure 4:
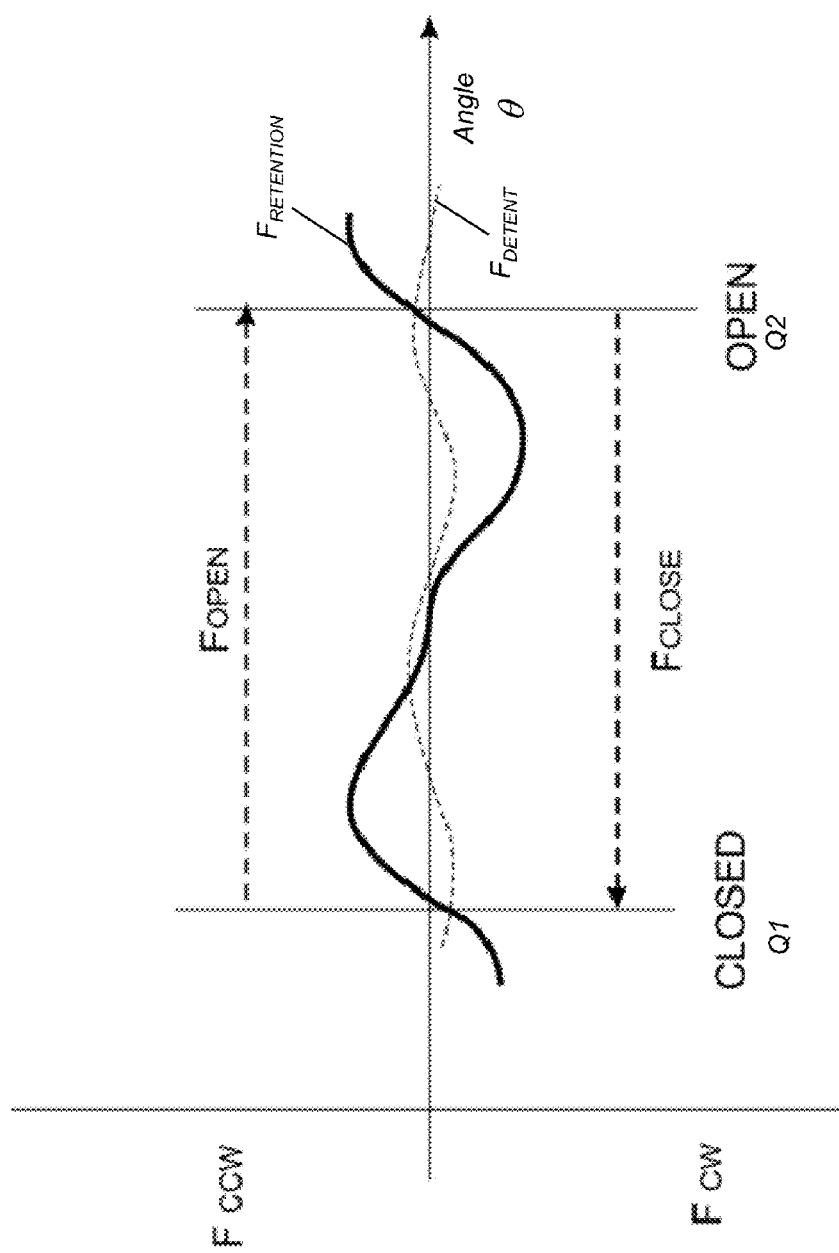
FIG. 4 is a graph that shows the force operating on a shutter blade during retention and motion in accordance with FIGS. 1 and 2A-K.

FIG. 4 is a graph that shows the forces operating on shutter blade 40 during retention and motion in accordance with FIGS. 1-3. At any angular position of motor shaft 12, designated Angle θ, there can be a total force F acting on blade 40 in either a clockwise direction, $F_{CW}$, or a counter-clockwise direction, $F_{CCW}$.

First, consider when no power is applied. Stepper motor 10 in an un-energized state has a slight inherent holding force, $F_{DETENT}$. This holding force, shown by a dashed line at different angle θ positions, is inherent to the design of the stepper motor 10 itself and is defined by the design of the internal magnet and stator of the motor 10. $F_{DETENT}$ has a sinusoidal characteristic, alternating between clockwise and counter-clockwise positions, with relatively weak energy as shown. At zero-crossing angles or nodal points there is no torque on the shutter blade 40; however, a restoring torque is applied if the blade is moved away from either side of these nodal points. The zero-crossing angles correspond to full step positions of the stepper motor. Adjacent zero-crossing angles correspond to adjacent motor steps. Absent other forces acting upon it, the shaft of the stepper motor settles at the nearest full step position when power is removed.

Force considerations change when power is applied. Energizing the stepper motor drives the blade 40 towards either the OPEN or CLOSED positions by applying forces $F_{OPEN}$ and $F_{CLOSE}$ respectively. To overcome the inherent holding torque that could otherwise resist blade movement, the electrical drive forces $F_{OPEN}$ and $F_{CLOSE}$ are significantly greater than $F_{DETENT}$, such as typically about 10 or more times higher.

Embodiments of the present invention add a magnetic retention force, $F_{RETENTION}$, to the set of forces operating on the shutter apparatus. $F_{RETENTION}$, shown in bold in FIG. 4, is variable at different angular positions of shutter blade 40. Magnetic force $F_{RETENTION}$, is designed to be significantly greater (or, alternatively stated, to provide a greater torque value) than the holding force $F_{DETENT}$ at particular angles, but less than the open and closing forces $F_{OPEN}$ and $F_{CLOSE}$. It is understood that magnetic retention force, such as that used in retention apparatus 70, can be used to bring a pivoted element to a retention position or retention angle after some transient settling time, typically with slight amounts of overshoot and undershoot during the settling interval.

Of particular interest in FIG. 4 are the two nodal points indicated as CLOSED and OPEN angles, corresponding to positions Q1 and Q2 of FIGS. 1-2B, respectively. The OPEN and CLOSED angles are predominantly defined by the geometry of the two components of shutter blade retention apparatus 70 that applies force $F_{RETENTION}$. By applying force $F_{RETENTION}$, it is possible to define the OPEN and CLOSED positions of the shutter blade without regard to the much lower hold force $F_{DETENT}$ of the motor in the de-energized state. This gives the shutter designer the ability to adjust the angle of the shutter blade for suitable OPEN and CLOSED positions, including positions that do not correspond to exact steps of the stepper motor, using an embodiment of the present invention. The much lower $F_{DETENT}$ force provides a slight additional bias on the nodal point position of the detent force. Under the influence of forces $F_{RETENTION}$ and $F_{DETENT}$, the shutter blade moves to an angle that balances both forces to an equilibrium state. The magnetic force $F_{RETENTION}$ far exceeds the holding force $F_{DETENT}$ and provides better blade retention than the slight inherent holding force $F_{DETENT}$ of the stepper motor.

One advantage provided by embodiments of the present invention is the capability to design shutter systems that are contactless, that is, systems without hard stops in either the OPEN or CLOSED positions. In typical stepper motor applications, as described previously, the shutter can be held in a given position by energizing the stepper motor at a power level that is lower than the drive power that generates forces $F_{OPEN}$ and $F_{CLOSE}$. Advantageously, embodiments of the present invention eliminate the need for providing power to the stepper motor after the blade is at a position.

Contactless operation can be particularly useful in power-sensitive, portable applications. In applications where shock is a consideration, embodiments of the present invention apply a retention force higher than the de-energized magnetic holding force $F_{DETENT}$. Using only magnetic force, without any hard stops, for blade retention creates a system with low sound emission and vibration when the blade is moved between the OPEN and CLOSED positions. The lack of impact shock at the two predefined OPEN and CLOSED positions reduces wear on the mechanical components of the shutter and extends component life.

It should be noted that it is also possible to provide multiple OPEN or CLOSED positions. This can be useful, for example, where the shutter blade has multiple apertures for modulating light intensity. A single magnet can operate on each detent to hold the shutter blade or other optical modulating element at more than two positions.

As noted previously, embodiments of the present invention allow the stepper motor to be driven to a position that corresponds to a fractional step, such as a shaft angular position that is halfway or two-thirds of the way between two discrete steps of the stepper motor. Magnetic attraction between stationary and movable members exceeds the inherent detent torque of the stepper motor, as noted previously with respect to FIG. 4.

According to an embodiment of the present invention, stationary member 30 is a permanent magnet, such as a neodymium or other rare-earth magnet and movable member 20 is machined from low-carbon steel or formed of powdered metal iron with a thin nickel coating for preventing corrosion.

According to an embodiment of the present invention, stepper motor 10 is an NMB PM10S stepper motor from NMB Technologies Corporation, Chatsworth, Calif. The PM10S motor has a 20 degree step angle. Detent torque, or "holding force", of the shaft is relatively low for this stepper motor in the non-energized state. The stepper motor is a typical "tin can motor" that has a steel shaft, a steel exterior and steel flanges. Member 20 was machined from low-carbon 1018 steel, with arms 22 and 24 machined to correspond to two desired blade positions Q1 and Q2 as shown in FIGS. 1-2B. The blade movement between positions Q1 and Q2 is 50 degrees, which corresponds to two and one-half steps of the NMB stepper motor. Blade 40 can be made of magnetically responsive spring steel or of non-magnetic 304 stainless steel.

The shape of movable member 20, magnetically conductive path, and stationary member 30 provides good holding force at the two blade positions. The parts were bonded so that blade position 40 was initially in a de-energized detent position Q1. Position Q2 is then half-way between two detent positions. With retention apparatus 70, the retention power at position Q2 holds blade 40 firmly in position without the need for applied current. At the same time, the magnetic holding forces are low enough that stepper motor 10 can move the blade between the two desired positions. Motion of the blade is silent and shock free. Using soft or non-magnetic material for blade 40 appears to make little or no difference in operation or performance.

Using the parts geometry shown with respect to FIGS. 2A through 2K, embodiments of the present invention do not hinder operation of the stepper motor. The magnetically conductive elements of the motor shell and body help to reduce the size of components for members 20 and 30.

Figure 5:
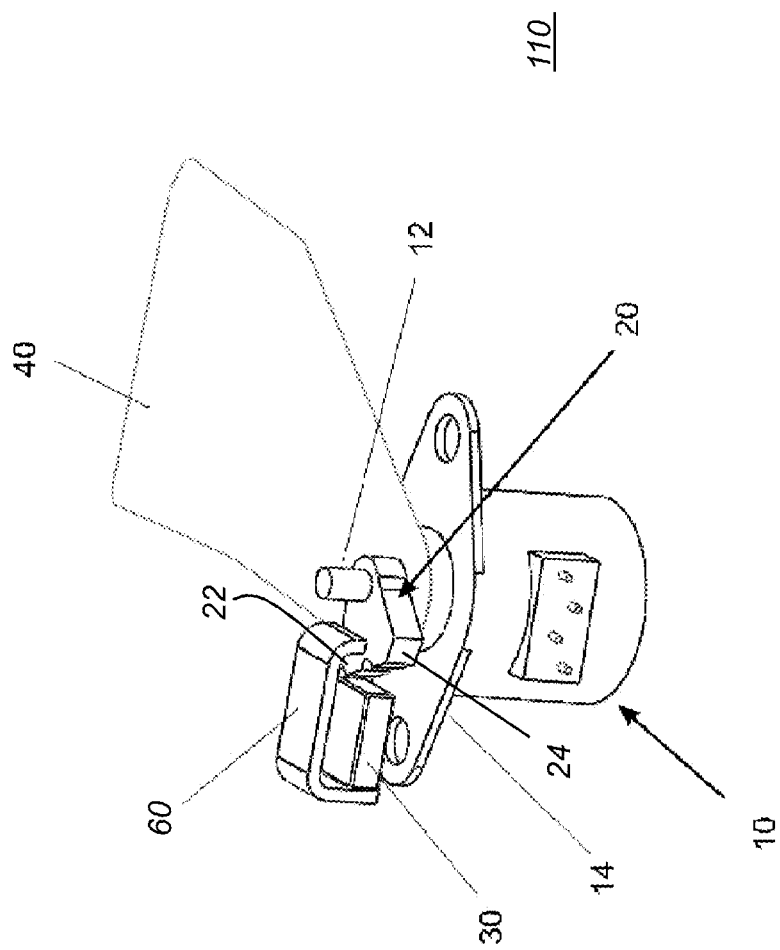
FIG. 5 is a perspective view of a stepper motor shutter apparatus in an alternate embodiment of the present invention.
Figure 6:
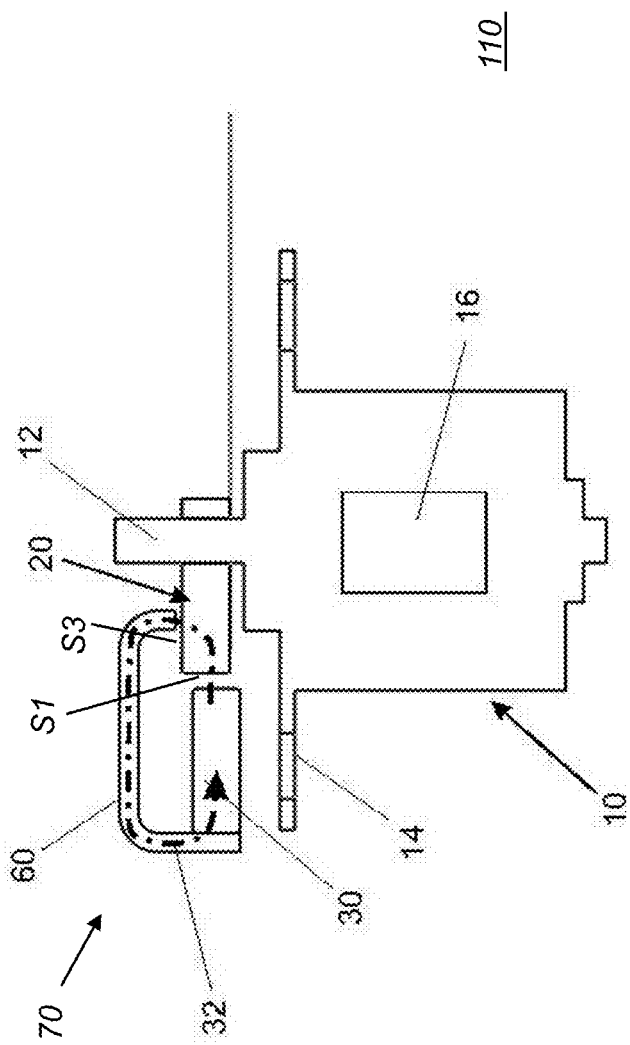
FIG. 6 is a section view of a stepper motor shutter apparatus according to the embodiment shown in FIG. 5.

FIG. 5 is a perspective view of an optical stepper motor shutter apparatus 110 in accordance with an alternate embodiment of the invention. FIG. 6 is a side view for this alternate embodiment. As part of shutter blade retention apparatus 70, a field keeper 60 is used to provide an alternative flux path between movable and stationary members 20 and 30, respectively. According to an embodiment of the present invention, stationary member 30 is a magnet. Keeper 60 extends from the far pole of the magnet of member 30 to a surface S3 of movable member 20, spaced apart from the bulk of the magnetic flux field that lies between members 20 and 30. In the example shown in FIGS. 5 and 6, surface S3 is substantially orthogonal (90 degrees+/−10 degrees) to surface S1.

The section view of FIG. 6 shows stepper motor shutter apparatus 110 with flux path 32 guided by keeper 60. The flux through path 32 takes the shortest magnetically conductive path. The field exits the pole adjacent to member 20 and is directed back toward stationary member 30 through the corresponding arm 22 or 24 (FIG. 5). One end of field keeper 60 is in contact with one pole of the magnet (member 30), while the other end is disposed over the central portion of member 20, in order to reduce or prevent any field from flux path 32 from creating rotational forces on shaft 12. Flux path 32 travels through field keeper 60 to the other pole of member 30. Field keeper 60 extends far enough from the permanent magnet of either member 20 or 30 so that the field properly passes through the gap between members 20 and 30.

The alternative structure shown in FIGS. 5 and 6 can be used if there is no magnetically conductive path through the shaft 12 and outer case or shell of stepper motor 10. The use of field keeper 60 adds size and components. The embodiment of FIGS. 1-3 has advantages of compact size and fewer parts, and appears to work best if there is a magnetically conductive path though stepper motor 10.

It should be noted that no magnetically conductive path is required to create magnetic detent at two blade positions. Members 20 and 30 can be sized to provide the detent force in the absence of a magnetically conductive path. However, without conducting components, the resulting arrangement can be larger and less efficient. It should further be emphasized that the overall shape of either member 20 and 30 can be modified if this helps to improve performance.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. An optical shutter apparatus comprising:
    a) a shutter blade that is pivotable between a first position and a second position that is spaced apart from the first position, and wherein the shutter blade in the first position blocks at least a portion of a light path;
    b) a stepper motor that is energizable to pivot the shutter blade to at least the first or second positions; and
    c) a magnetic shutter blade retention apparatus that has:
        (i) at least a first movable member with a first surface, and wherein the at least the first movable member is coupled to the shutter blade; and
        (ii) at least a first stationary member that is spaced apart from the shutter blade,
    wherein the at least the first movable member is magnetically attracted to the at least the first stationary member when the stepper motor is de-energized and wherein, when the shutter blade is pivoted to the first position by the stepper motor, a point on the first surface is spaced apart from the at least the first stationary member by a first distance, and
    wherein, when the shutter blade is pivoted to the second position by the stepper motor, the point on the first surface is spaced apart from the at least the first stationary member by a second distance that is less than the first distance.

2. The apparatus of claim 1 wherein the stepper motor has an integer number of step positions and wherein a stepper motor shaft is between two adjacent step positions when the shutter blade is in either the first or second position.

3. The apparatus of claim 1 wherein shutter blade travel past the first position or past the second position is unobstructed.

4. The apparatus of claim 1 further comprising one or more stops for shutter blade travel.

5. The optical shutter apparatus of claim 1 wherein the at least the first movable member is a permanent magnet.

6. The optical shutter apparatus of claim 1 wherein the at least the first stationary member is a permanent magnet.

7. The optical shutter apparatus of claim 6 further comprising a magnetic field keeper that guides magnetic flux from a pole of the permanent magnet to a second surface of the at least the first movable member.

8. The optical shutter apparatus of claim 1 wherein the shutter blade is further pivotable beyond the second position to a third position and wherein the magnetic shutter blade retention apparatus provides a magnetic retention force for the shutter blade at each of the first, second, and third positions.

9. The optical shutter apparatus of claim 1 wherein the magnetic shutter blade retention apparatus further comprises a second stationary member that is spaced apart from the shutter blade.

10. An optical shutter apparatus comprising:
    a) a shutter blade that is pivotable between a first position and a second position that is spaced apart from the first position, and wherein the shutter blade in the first position blocks at least a portion of a light path;
    b) a stepper motor that is energizable to pivot the shutter blade to at least the first or second positions; and
    c) a magnetic shutter blade retention apparatus that has:
        (i) a movable member with a first surface, wherein the movable member is coupled to a shaft of the shutter blade; and
        (ii) a stationary member that is spaced apart from the shutter blade,
    wherein the movable member is magnetically attracted to the stationary member when the stepper motor is de-energized and
    wherein, when the shutter blade is pivoted to the first position by the stepper motor, the first surface is spaced apart from the stationary member by a first distance, and
    wherein, when the shutter blade is pivoted to the second position by the stepper motor, the first surface is spaced apart from the stationary member by a second distance that is less than the first distance.

11. The apparatus of claim 10 wherein the stepper motor has an integer number of step positions and wherein a stepper motor shaft is between two adjacent step positions when the shutter blade is in either the first or second position.

12. The apparatus of claim 10 wherein shutter blade travel past the first position or past the second position is unobstructed.

13. The apparatus of claim 10 further comprising one or more stops for shutter blade travel.

14. The apparatus of claim 10 wherein the movable member is a permanent magnet.

15. The optical shutter apparatus of claim 10 wherein the stationary member is a permanent magnet.

16. The optical shutter apparatus of claim 15 further comprising a magnetic field keeper that guides magnetic flux from a pole of the permanent magnet to a second surface of the movable member.

17. A method for selectively blocking light through an aperture, the method comprising:
    a) providing a shutter blade that is pivotable between a first position and a second position that is spaced apart from the first position, and wherein the shutter blade in the first position blocks at least a portion of a light path;
    b) coupling a movable member to the shutter blade;
    b) energizing a stepper motor to pivot the shutter blade to the first position;
    c) de-energizing the stepper motor;
    d) magnetically retaining the shutter blade in the first position by magnetic attraction between the movable member and a stationary member that is spaced apart from the shutter blade;
    e) energizing the stepper motor to pivot the shutter blade to the second position; and
    f) magnetically retaining the shutter blade in the second position by magnetic attraction between the movable member and the stationary member.

18. The method of claim 17 wherein coupling the movable member to the shutter blade comprises coupling a magnet to the shutter blade.

* * * * *